United States Patent Office 3,748,359
Patented July 24, 1973

3,748,359
ALKYLADAMANTANE DIAMINE
Robert M. Thompson, Chalfonte, Wilmington, Del., assignor to Sun Research and Development Co., Philadelphia, Pa.
No Drawing. Filed Oct. 22, 1971, Ser. No. 191,826
Int. Cl. C07c 87/40
U.S. Cl. 260—563 P      2 Claims

ABSTRACT OF THE DISCLOSURE

This invention relates to a alkyladamantane diamine; namely, 1,3 - dimethyleneamine-5,7-dimethyladamantane, and to the preparation of it and its homologues from an alkyladamantane diacid The preparation starts with the chlorination of the alkyladamantane diacid which is followed by the amidation of the resulting diacid chloride, which in turn is followed by the dehydration of the resulting diamide and ends with the hydrogenation of the resulting dinitrile. The named diamine has the following structural formula:

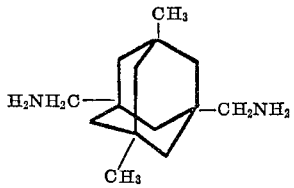

and is a white, crystalline solid useful in various applications, for example corrosion inhibitor, chemical intermediate, and a component of useful polymers.

CROSS-REFERENCE TO RELATED APPLICATIONS

This invention is related to those described and claimed in applicant's applications Ser. Nos. 191,827, 191,833, 191,700, and 191,706 abandoned Nov. 20, 1972, all filed the same date as this application. The first of the aforementioned applications relates to the preparation of an alkyladamantane dinitrile from an alkyladamantane diacid; the second relates to a polyamide polymer derived in part from an alkyladamantane diamine; the third to a novel polyimide prepared from an alkyladamantane diamine, and the fourth to a method for preparing a water white polyimide polymer from an alkyladamantane diamine.

SUMMARY OF THE INVENTION

This invention pertains to the preparation of an alkyladamantane diamine from an alkyladamantane diacid; said diamine being useful as a corrosion inhibitor and as a chemical intermediate. The process involves the contacting of a certain alkyladamantane diacid with a chlorinating agent, and thereafter converting the resulting acid chloride to a diamide and thereafter contacting the diamide with a dehydrating agent to form a dinitrile and thereafter converting the dinitrile, in presence of hydrogen and a hydrogenation catalyst, to the desired diamine. The invention also pertains to alkyladamantane diamines; and more particularly, 1,3-dimethyleneamine-5,7-dimethyladamantane (alternate name: 1,3 bis-methylamine-5,7-dimethyladamantane).

DESCRIPTION OF THE INVENTION

The process is illustrated by the following equations:

(1) $\text{HOOC-A-COOH} \xrightarrow{\text{chlorinating agent}} \text{Cl-CO-A-CO-Cl}$ (2) $\text{Cl-CO-A-CO-Cl} \xrightarrow{\text{amidating agent}} \text{H}_2\text{N-CO-A-CO-NH}_2$ (3) $\text{H}_2\text{N-CO-A-CO-NH}_2 \xrightarrow{\text{dehydrating agent}} \text{N}\equiv\text{C-A-C}\equiv\text{N}$ (4) $\text{N}\equiv\text{C-A-C}\equiv\text{N} \xrightarrow{\text{hydrogen + hydrogenation catalyst}} \text{H}_2\text{N-H}_2\text{C-A-CH}_2\text{-NH}_2$ wherein A represents

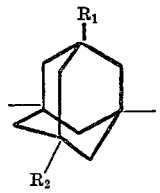

and each of $R_1$ and $R_2$ is an alkyl radical having 1–10 carbon atoms.

Preparation of an alkyladamantane diacid, which is shown as the reactant in the aforementioned Equation 1, and in particular 1,3-dimethyladamantane-5,7-dicarboxylic acid, is described in U.S. Pat. No. 3,356,719, issued Dec. 5, 1967, A. Schneider et al.

The reactant alkyladamantane diacid can be only one such diacid, for example, 1,3-dimethyladamantane-5,7-dicarboxylic acid, 1-methyl,3-ethyladamantane-5,7-dicarboxylic acid, 1 pentyl-3-hexyladamantane-5,7-dicarboxylic acid, etc., or a mixture of such acids, for example, 1,3-dimethyladamantane-5,7-dicarboxylic acid and 1-methyl, 3-ethyladamantane-5,7-dicarboxylic acid and the like.

Initially, an alkyladamantane diacid is contacted with a suitable chlorinating agent; see aforementioned Equation 1. Examples of such agents are $SOCl_2$, $POCl_3$ and $PCl_5$; these are preferred. $SOCl_2$ is particularly useful since its reaction products; i.e., $SO_2$ and HCl are gaseous, thereby facilitating their removal from the solid acid chloride and any unreacted diacid. Also, $SOCl_2$ as a chlorinating agent, has the advantage of having a boiling point of about 80° C. This low boiling point means any excess $SOCl_2$ can be removed efficiently by heating the reaction mixture with steam.

The mole ratio of chlorinating agent to the alkyladamantane diacid used in the first contacting step is not critical and can be as low as 0.01 or as high as 100. If an excess amount; i.e., an amount greater than that estimated necessary by stoichiometric calculations to react with all the diacid, of chlorinating agent is used, then the excess remaining after the chlorination reaction can be removed. However, balancing increasing the yield after chlorination versus reducing the amount of excess agent to be removed, a more convenient ratio of agent to diacid is 0.1 to 10 and preferably, 0.9 to 5. Thus the amount of chlorinating agent used to contact the diacid should be sufficient to convert most, preferably all of the diacid to the corresponding acid chloride.

The temperature at which the alkyladamantane diacid contacts the chlorinating agent can be between 0° C. and the decomposition temperature of the diacid. A temperature range of about 40° C.–140° C. is preferred with 60° C.–130° C. most preferred.

The time required for converting the diacid to the acid chloride depends on such variables as the temperature of contacting, the amount of mixing, if any, and the quantity of diacid being treated.

The acid chloride resulting from the contacting of the diacid and chlorinating agent before further processing, can be separated, and if necessary, purified further to remove any undesired by-products or unreacted diacid.

The next step is the amidation of the acid chloride; i.e., the aforementioned Equation 2. Two methods, described hereinafter, are workable. One method employs the use of a solvent and $NH_3$; the other uses $NH_4OH$.

The solvent method is as follows. The resulting acid chloride, with or without prior purification, is dissolved in a suitable solvent. A suitable solvent is one which does not substantially react with the acid chloride or the amidating agent; an unsatisfactory solvent is one containing an —OH group, e.g., water or alcohol. Suitable solvents include ethers and aromatic solvents such as benzene and toluene. The lower boiling solvents are particularly useful since they can be easily removed by evaporation at lower temperatures. A sufficient quantity of solvent to dissolve substantially all of the acid chloride is generally employed.

After the aforementioned solution is formed, it is contacted with $NH_3$. The contacting can be performed several ways, e.g., bubbling $NH_3$ through the solution. However, because the formation of the diamide is exothermic, heat removal is required. Thus, while the amidating step can be conducted at 0° C.–50° C.; 0° C.–30° C. is preferred, and in particular, 0° C.–20° C.

The time required for converting the acid chloride to the diamide depends on such variables as the rate at which the $NH_3$ contacts the mixture and the quantity of mixture being treated.

An alternate amidating step employs $NH_4OH$; concentrated $NH_4OH$ is preferred. The acid chloride contacts the concentrated $NH_4OH$. The resulting $NH_4Cl$ remains dissolved in the water whereas the diamide, which is insoluble, precipitates out.

In either of the aforementioned amidations, the mole ratio of amidating agent to dichloride used in either of the amdations is not critical and can be as low as 0.01 or as high as 100. If an excess amount; i.e., an amount greater than that estimated necessary by stoichiometric calculations to react with all the dichloride is used, then the excess remaining after the amidation can be removed. However, balancing increasing the yield after amidations versus reducing the amount of excess agent to be removed, a more convenient mole ratio of agent to diacid is 0.1–10.0 and preferably 0.9–5.0. In either of the amidations, the amount of amidating agent used to contact the dichloride should be sufficient to convert most, preferably all, of the dichloride to the corresponding diamide.

The resulting diamide can be treated by known methods to remove any unreacted acid chloride, and/or unwanted by-products and/or to neutralize any $NH_3$ or $NH_4OH$ remaining with the diamide.

As referred to in the aforementioned Equation 3, the diamide is then contacted wtih a suitable dehydrating agent. Some examples of such agents are $SOCl_2$, $P_2O_5$, $POCl_3$, $PCl_5$, $NH_4OSO_2NH_2$ and $C_6H_4(CO)_2O$; these are preferred. Normally, the diamide is dissolved in a suitable aromatic solvent such as benzene or toluene. Lower boiling solvents are particularly useful because of their ease of evaporation. To the resulting solution sufficient dehydrating agent is added to convert the diamide to the dinitrile. $SOCl_2$ as a dehydrating agent is particularly useful since it forms gaseous $SO_2$ and HCl, both of which evolved from the mixture.

The mole ratio of dehydrating agent to diamide used is not critical and can range from as low as 0.01 to as high as 100.0. If an excess amount; i.e., an amount greater than that estimated necessary by stoichiometric calculations to react with all the diamide is used, then the excess remaining after the dehydration can be removed. However, balancing increasing the yield after dehydration versus reducing the amount of excess agent to be removed, a more convenient mole ratio of agent to diamide is 0.1–10.0 and preferably 0.9–5.0. The amount of dehydrating agent used to contact the diamide should be sufficient to convert most, preferably all, of the diamide to the corresponding dinitrile.

The temperature at which the diamide is contacted by a suitable dehydrating agent is between 0° C. and the decomposition temperature of the diamide. A temperature range of about 40° C.–150° C. is preferred; a range of about 60° C.–130° C. is most preferred.

The time required for converting substantially all diamide to the dinitrile depends on such variables as the temperature of contacting and the quantity of diamide being converted.

After sufficient time has lapsed to convert the diamide to the dinitrile, the latter can be separated from the reaction mixture. This separation is desirable and can be achieved in numerous ways. If excess dehydrating agent is used, the reaction mixture is made basic by a suitable reactant. Thus, for example, if the dehydrating agent is $SOCl_2$, it is made basic with a dilute KOH solution. And, after separation of the water layer from the aromatic solvent, the dinitrile will crystallize out upon standing. An alternative is to evaporate the lower boiling solvent; this is particularly useful if no excess dehydrating agent was used.

The resulting crystallized dinitrile can also be separated from the solvent by filtration or decanting. Then the dinitrile can be recrystallized from a suitable solvent, e.g., benzene-hexane solution, to remove any undesirable co-products or unreacted starting material.

As referred to in the aforementioned Equation 4, the dinitrile is then contacted with hydrogen in the presence of a suitable hydrogenation catalyst. Some examples of suitable catalysts are Raney nickel, Raney cobalt, rhodium on carbon, platinum on carbon and palladium on carbon; these are preferred. The hydrogenation step can occur at a wide range of pressure; i.e., from essentially atmospheric to many thousand atmospheres. Some positive pressure is preferred since this helps the reaction to completion. A preferred pressure range is 100–5000 p.s.i.; with 100–1000 p.s.i. being most preferred.

The temperature at which the dinitrile is contacted with hydrogen in the presence of a suitable catalyst is between 0° C. and the decomposition temperature of the dinitrile. A temperature range of about 40° C.–130° C. is preferred; a range of about 50° C.–100° C. is most preferred.

The hydrogenation step can take place in a suitable solvent. A suitable solvent is one that does not enter into a reaction with the dinitrile or the diamine and does not react with the hydrogenation catalyst being used. A further requirement for the suitable solvent is that both the starting dinitrile and the diamine product be soluble therein. Another requirement can be that a nitrogen-containing material such as $NH_3$ be readily soluble in the solvent. If a solvent is used and it is saturated with $NH_3$, the formation of secondary amines is reduced. Examples of such suitable solvents are methanol, ethanol and isopropanol. Such solvents must be absolutely free of water.

The time required for hydrogenating substantially all the dinitrile to the diamine depends on such variables as the temperature of contacting and the quantity of the dinitrile being hydrogenated.

After sufficient time has lapsed to hydrogenate the dinitrile to the diamine, the latter is separated from the reaction mixture and in particular, the catalyst and any solvent that may have been used.

The diamine can be refined to remove any unreacted dinitrile or any coproducts formed during the hydrogenation step. The refining step can be crystallization, filtration, or distillation. Alternatively, depending on the final use, the diamine may not be refined.

In order to further illustrate the invention, the following example is given.

Example

Thirty grams of liquid $SOCl_2$ and 22.8 grams of solid 1,3-dimethyladamantane - 5,7 - dicarboxylic acid were placed in a suitable glass container and the mixture was refluxed for about 16 hours on a steam bath. After this refluxing, the excess $SOCl_2$ in the reaction mixture was removed by distillation at lower than atmospheric pressure.

The resulting acid chloride was then dissolved in 300 milliliters of ether. Through this ether solution, maintained at 0° C., ammonia was bubbled for about 2 hours. Afterwards, the mixture was heated on a steam bath to evaporate the ether solvent.

The resulting diamide was then stirred into a glass container containing some dilute aqueous KOH. The diamide was filtered from the KOH solution, washed with water and then dried for about 16 hours at 80° C. under a vacuum. This washing procedure removed any undesired coproducts. The melting point of the diamide was 246° C.–251° C.; the yield was 20 grams.

The 20 grams of the aforementioned diamide and 30 grams of $SOCl_2$ were placed in a glass container containing 125 milliliters of benzene. The resulting mixture was refluxed for about 16 hours. After refluxing, the mixture was poured into a container holding some ice. To the ice mixture sufficient dilute KOH solution was added to obtain a pH of 7. The benzene layer, containing most of the dinitrile, was removed from the water layer. The latter was washed twice with benzene and the benzene washings were combined with the benzene layer. The composite benzene mixture was mixed with a drying agent; i.e., magnesium sulfate and then the sulfate was filtered from the benzene. This removed any water remaining in the benzene. The benzene was allowed to stand for about 16 hours. During this standing the dinitrile crystallized out of the benzene. The solid was filtered from the benzene.

The removed filtered dinitrile was then added to a container holding a warm, benzene-hexane mixture. Upon standing, the dinitrile crystallized out of the cooled mixture. The dinitrile was filtered out and dried. Fifteen grams of 1,3-dimethyladamantane-5,7-dinitrile were obtained. The melting point of the white solid dinitrile was 131° C.–134° C.

The 15 grams of the dinitrile were placed in a 300 milliliter stainless steel bomb along with 2 grams of Raney nickel and 60 milliliters of methanol saturated with $NH_3$. The bomb was sealed and tested for leaks by injecting into the bomb nitrogen at 1800 p.s.i. The bomb maintained the pressure for sufficient time to indicate that no leaks were present. Subsequently, the pressure within the bomb was reduced to 1200 p.s.i. Containing the aforementioned pressure, the bomb was then heated to 60° C. and the temperature was maintained at 60° C. while the bomb was rocked for 10 hours.

After 10 hours the bomb was cooled to room temperature and the pressure reduced to atmospheric. The contents of the bomb were emptied into a suitable container. The methanol was then removed by heating the container with steam. Thirteen grams of crude diamine were recovered.

The aforementioned crude diamine was then distilled on a spinning band distillation column. The fraction boiling between 87° C. and 89° C. at 2 milliliters of mercury was collected. The refined diamine contained, by nitrogen analysis, 12.48% compared to a calculated value of 12.43%.

The resulting 1,3-dimethyleneamine - 5,7 - dimethyladamantane has utiliy as a component of useful polymers.

Other adamantane diacids such as 1-methyl-3-ethyl-adamantane-5,7-dicarboxylic acid, 1-3-diethyladamantane-5,7-dicarboxylic acid, etc., up to and including 1-3-didecyl-adamantane-5,7-dicarboxylic acid can be converted into corresponding diamines by the aforementioned process.

The invention claimed is:

1. An alkyladamantane diamine having the following structural formula:

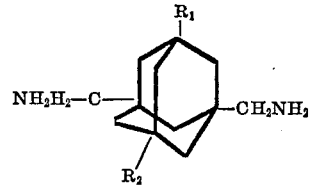

wherein each of $R_1$ and $R_2$ is an alkyl radical having 1–10 carbon atoms.

2. An alkyladamantane diamine according to claim 1 wherein each of $R_1$ and $R_2$ is a methyl radical.

References Cited

UNITED STATES PATENTS

| | | | |
|---|---|---|---|
| 2,389,217 | 11/1945 | Surrey | 260—465.2 |
| 2,502,412 | 4/1950 | Ardis | 260—464 |
| 3,372,195 | 3/1968 | Little | 260—563 D |
| 3,501,528 | 3/1970 | Rutzen | 260—563 D |
| 3,595,917 | 7/1971 | Trecker et al. | 260—563 D |
| 3,624,122 | 11/1971 | Kamal et al. | 260—563 D |
| 3,163,676 | 12/1964 | Potts | 260—563 D |
| 3,646,095 | 2/1972 | Moore | 260—464 |

FOREIGN PATENTS

| | | | |
|---|---|---|---|
| 119,494 | 11/1966 | Japan | 260—563 D |

LEWIS GOTTS, Primary Examiner

D. R. PHILLIPS, Assistant Examiner

U.S. Cl. X.R.

260—464, 544 L, 557 R, 563 D, 563 P